United States Patent [19]

Melendrez

[11] Patent Number: 5,080,080
[45] Date of Patent: Jan. 14, 1992

[54] METHOD AND APPARATUS TO IMPROVE FUEL ECONOMY OF INTERNAL COMBUSTION ENGINES

[75] Inventor: Julian B. Melendrez, Vancouver, Wash.

[73] Assignee: Kynetik Marketing, Inc., Vancouver, Wash.

[21] Appl. No.: 558,690

[22] Filed: Jul. 26, 1990

[51] Int. Cl.⁵ .................. F02B 75/00; F02M 33/00
[52] U.S. Cl. ...................... 123/538; 123/536
[58] Field of Search ................ 123/536, 537, 538

[56] References Cited

U.S. PATENT DOCUMENTS

| | | | |
|---|---|---|---|
| 4,308,847 | 1/1982 | Ruizzo | 123/536 |
| 4,357,237 | 11/1982 | Sanderson | 123/538 |
| 4,461,262 | 7/1984 | Chow | 123/536 |
| 4,538,582 | 9/1985 | Wakuta | 123/536 |
| 4,572,145 | 2/1986 | Mitchell et al. | 123/538 |

Primary Examiner—E. Rollins Cross
Assistant Examiner—M. Macy
Attorney, Agent, or Firm—Klarquist, Sparkman, Campbell, Leigh & Whinston

[57] ABSTRACT

The present invention is a method and apparatus to improve the fuel economy of internal combustion engines by inducing a magnetic field in the fuel as it flows into a carburetor or fuel injector system. A rubber fuel line, without any metal reinforcements, is used to convey the fuel from an inlet fitting made of steel or aluminum to an outlet fitting, again, made of steel or aluminum. A magnet is placed so that its south pole is in contact with the rubber fuel line. A rubber wrap is placed about the magnet and about the portion of the fuel line in contact with the magnet to further focus the magnetic field on the flowing fuel. The magnetic field induced in the flowing fuel ionizes the hydrocarbon fuel to increase combustion efficiency, thus, increasing fuel economy.

8 Claims, 2 Drawing Sheets

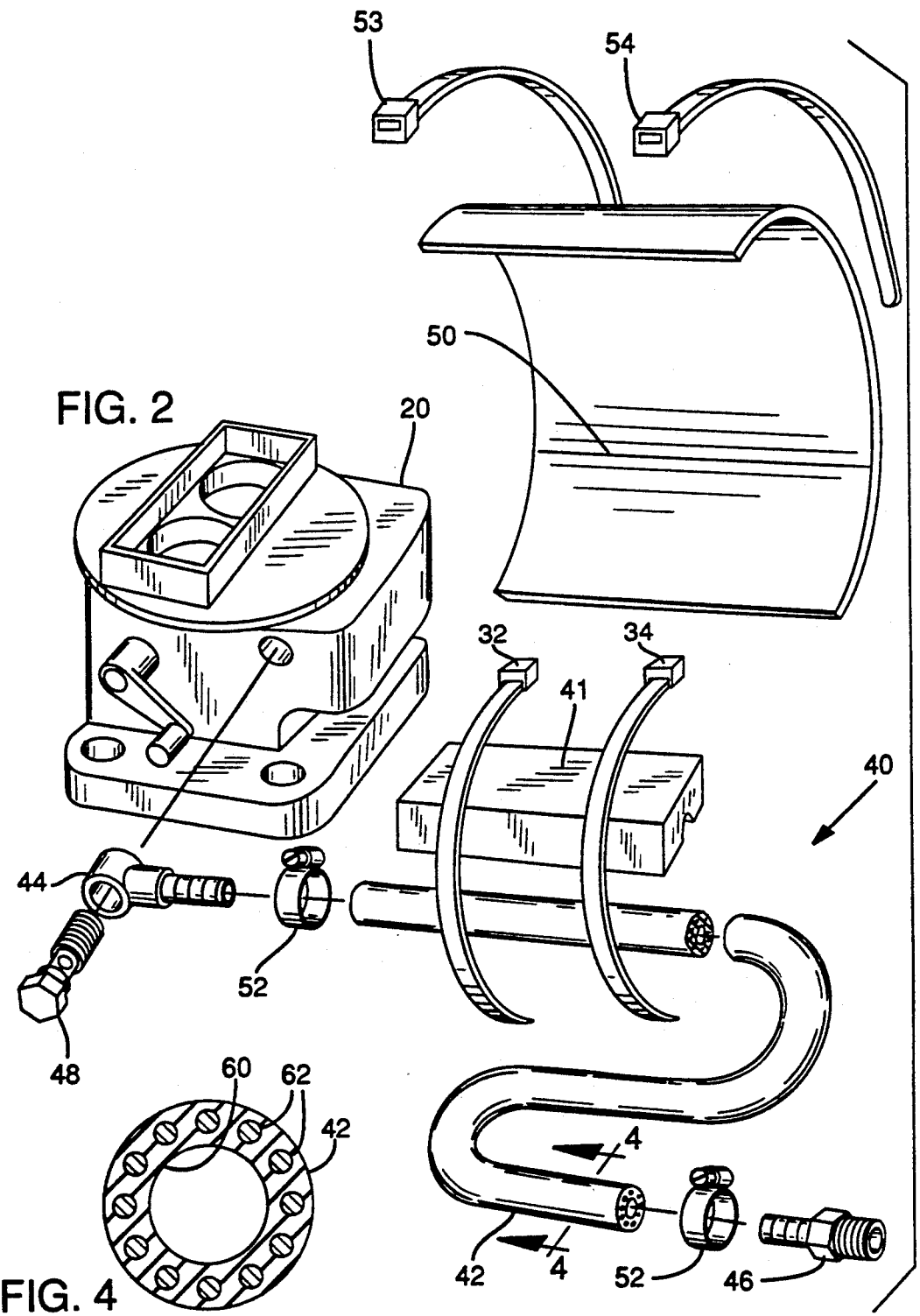

METHOD AND APPARATUS TO IMPROVE FUEL ECONOMY OF INTERNAL COMBUSTION ENGINES

TECHNICAL FIELD

The present invention relates to a method and apparatus to improve the fuel economy of internal combustion engines. Specifically, the invention relates to placing a permanent magnet about a rubber fuel line and then wrapping the magnet and the fuel line with a rubber sheet to induce a magnetic field in the flowing fuel.

BACKGROUND ART

Permanent magnets have, for years, been used for attachment to fuel lines on internal combustion engines to increase the fuel economy of these engines. The specific mechanism of how the magnets increase the fuel economy is not fully understood. It is believed that the magnetic field partially ionizes the fuel flowing in the fuel lines to increase its affinity for oxygen, thus, producing more complete combustion of the fuel in the cylinders of the engine.

One such magnet is marketed by H. K. Research and Development, 33491 Calle Miramar, San Juan Capsitra, Calif., as a HK-12 Unit. The H. K. Research and Development magnet is affixed to a standard fuel line by means of nylon straps. Although these units tend to increase the fuel economy of the engine to which they are attached, it has been found that further increases in the fuel economy can be realized.

SUMMARY OF INVENTION

It is an object of the invention to increase fuel economy of an internal combustion engine by exposing the fuel to a magnetic field.

It is a further object of the invention to increase the fuel economy of an internal combustion engine by transporting the fuel in a rubber fuel line thereby increasing the magnetic field induced in the fuel by a permanent magnet.

An additional object of the invention is to increase the fuel economy of an internal combustion engine by shielding the magnetic field induced in a rubber fuel line with a rubber wrap about the magnet.

The present invention utilizes a large inside diameter rubber fuel line having no metal reinforcements for transporting fuel from an inlet side to an outlet side. An aluminum or steel fitting is used to connect the inlet side of the fuel line to a fuel pump. The outlet side of the fuel line has an aluminum or steel fitting for connecting the outlet of the fuel line to a carburetor or fuel injection system of an internal combustion engine. A permanent magnet is held against the fuel line such that its south pole is in contact with the rubber fuel line. A rubber wrap is placed about the magnet and the portion of the fuel line in contact with the magnet to further shield the magnetic field about the fuel line.

The magnet directs a magnetic field toward the fuel line and induces the magnetic field into any fuel flowing through the fuel line.

Other objects and advantages of the present invention will be apparent from the following description of a preferred embodiment thereof and from the attached drawings.

BRIEF DESCRIPTION OF THE DRAWINGS

FIG. 2 is a blow-up view of the various components of the apparatus to improve fuel economy of an internal combustion engine of the present invention.

FIG. 4 is a cross-sectional view of the rubber fuel line taken along arrows 4—4 of FIG. 2.

DETAILED DESCRIPTION OF THE INVENTION

Figure 1:
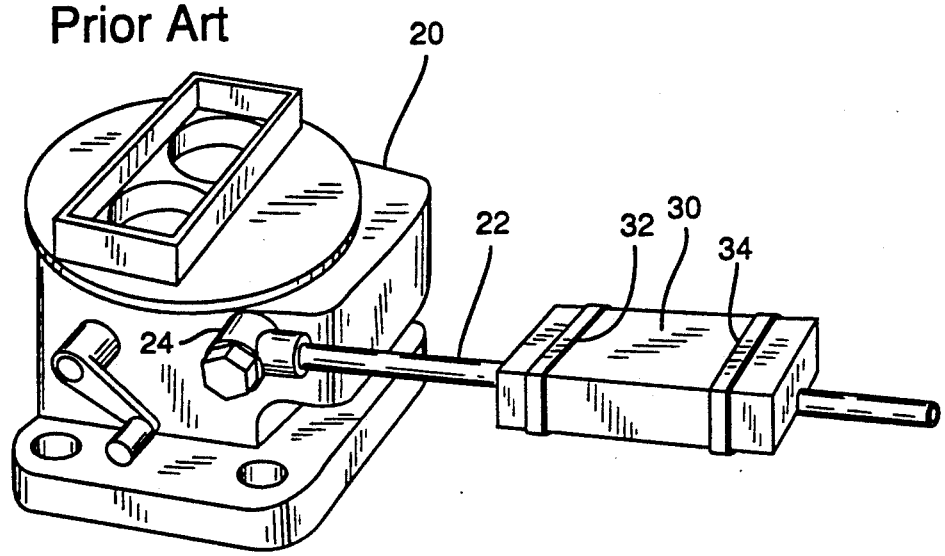
FIG. 1 is a perspective view of a prior art magnet attached to a fuel line of an internal combustion engine.

FIG. 1 depicts the carburetor 20 of an internal combustion engine being fed by a metal fuel line 22 which terminates in a brass fitting 24. A magnet 30, such as produced by H. K. Research and Development, 33491 Calle Miramar, San Juan Capsitra, Calif., and designated a HK-12 Unit is shown strapped to the fuel line 22 by nylon straps 32 and 34. The HK-12 magnet 30 is approximately 1" high and 3½" square and produces approximately 940 gauss. This particular arrangement has been shown to increase the fuel mileage of diesel tractors by approximately 12.8 percent as shown in Table I. Table I shows a test on a series of diesel tractors without the HK-12 magnet assembly and with the HK-12 magnet assembly.

TABLE I

| Tractor Number | Without Unit MPG | With Only HK-12 MPG | % Increase in MPG |
|---|---|---|---|
| 70 | 4.56 | 5.40 | 18.42 |
| 72 | 5.60 | 6.12 | 9.29 |
| 74 | 5.36 | 6.29 | 17.35 |
| 75 | 5.25 | 5.55 | 5.71 |
| 76 | 5.47 | 5.75 | 5.12 |
| 77 | 5.30 | 5.83 | 12.71 |
| 83 | 5.06 | 6.40 | 26.48 |
| 84 | 5.00 | 6.30 | 26.00 |
| 88 | 6.07 | 6.19 | 1.28 |
| 89 | 4.98 | 5.09 | 4.20 |
| 94 | 5.91 | 6.32 | 7.37 |
| 96 | 5.91 | 6.24 | 7.28 |
| 103 | 5.80 | 6.61 | 14.07 |
| 104 | 5.38 | 6.59 | 22.50 |
| 111 | 5.82 | 6.08 | 4.51 |
| 112 | 5.48 | 5.78 | 6.06 |
| 114 | 5.80 | 5.89 | 2.05 |
| 115 | 5.47 | 6.40 | 17.00 |
| 118 | 5.60 | 6.31 | 12.70 |
| 121 | 5.77 | 5.88 | 5.26 |
| 122 | 5.81 | 6.34 | 9.12 |
| 131 | 5.43 | 6.25 | 15.10 |
| 132 | 5.95 | 6.62 | 11.26 |
| 134 | 5.72 | 6.28 | 9.80 |
| 135 | 5.08 | 6.04 | 18.91 |
| 136 | 5.48 | 5.79 | 5.71 |
| 137 | 5.83 | 6.03 | 3.43 |
| 138 | 4.84 | 5.37 | 10.95 |
| 139 | 5.44 | 5.46 | 0.37 |
| 140 | 5.12 | 5.44 | 6.25 |
| 141 | 5.42 | 6.22 | 12.68 |
| 143 | 4.83 | 5.27 | 9.11 |
| 144 | 4.83 | 5.58 | 15.53 |
| 145 | 4.84 | 5.43 | 12.20 |
| 147 | 5.36 | 5.54 | 3.46 |
| 148 | 4.92 | 5.40 | 10.06 |
| 149 | 5.41 | 6.52 | 25.14 |
| 150 | 5.74 | 6.83 | 15.51 |
| 151 | 5.25 | 6.94 | 32.19 |
| 162 | 5.23 | 6.14 | 18.41 |
| 173 | 4.99 | 5.28 | 5.81 |
| 174 | 5.63 | 5.84 | 3.73 |
| 179 | 5.76 | 6.09 | 5.73 |
| 185 | 5.31 | 5.78 | 8.90 |
| 188 | 5.00 | 5.50 | 10.00 |

TABLE I-continued

| Tractor Number | Without Unit MPG | With Only HK-12 MPG | % Increase in MPG |
|---|---|---|---|
| 189 | 5.33 | 5.97 | 12.00 |
| 191 | 4.08 | 5.59 | 37.00 |
| 192 | 4.95 | 6.44 | 30.10 |
| 195 | 4.73 | 6.21 | 31.30 |
| 196 | 4.87 | 6.22 | 27.72 |
| 197 | 5.35 | 5.62 | 5.05 |
| 198 | 4.82 | 5.98 | 24.07 |
| 200 | 5.57 | 6.44 | 15.62 |
| 201 | 4.71 | 5.66 | 20.17 |
| 503 | 5.04 | 6.36 | 26.19 |
| Average | 5.31 | 6.00 | 12.82% |

The magneto-hydrodynamic magnet unit 30 promotes improved burning of all hydrocarbon base fuels including gasoline, diesel, and propane. The magnet unit 30 is strapped to the fuel line 22 as close as possible to the carburetor 20 or fuel injection system. As fuel flows through the fuel line, it is influenced by a high intensity focused magnetic field which ionizes the fuel. This ionization process causes fuel hydrocarbons to exhibit a net positive molecular charge resulting in a hydrocarbon molecule that more readily bonds to the negative charged oxygen molecule. Magnetically influenced fuel dissolves carbon build up in carburetor jets, fuel injectors, and combustion chambers thereby helping to clean the engine. The resultant conditioned fuel burns more completely producing a higher BTU output, better fuel economy, more power, and reduced emissions.

In the past, it was felt that a higher magnetic field would increase this effect on the fuel. However, almost all fuel lines used today are either metal, plastic or steel reinforced. When the magnet was placed on these fuel lines, the magnetic force dissipated both up and down the fuel line from where the unit is placed. Within a few days the entire fuel line is magnetized but in a very weakened state. It was also found that some engines use brass fuel connectors on the fuel line. Brass, it has been found, totally negates the magnetic force. Also, metal surrounding the fuel line, such as the engine and other components, also attract the magnetic force from the unit and further dissipates the force. It has been found that by various improvements, the fuel mileage can be significantly increased by magneto-hydrodynamic effects.

Figure 3:
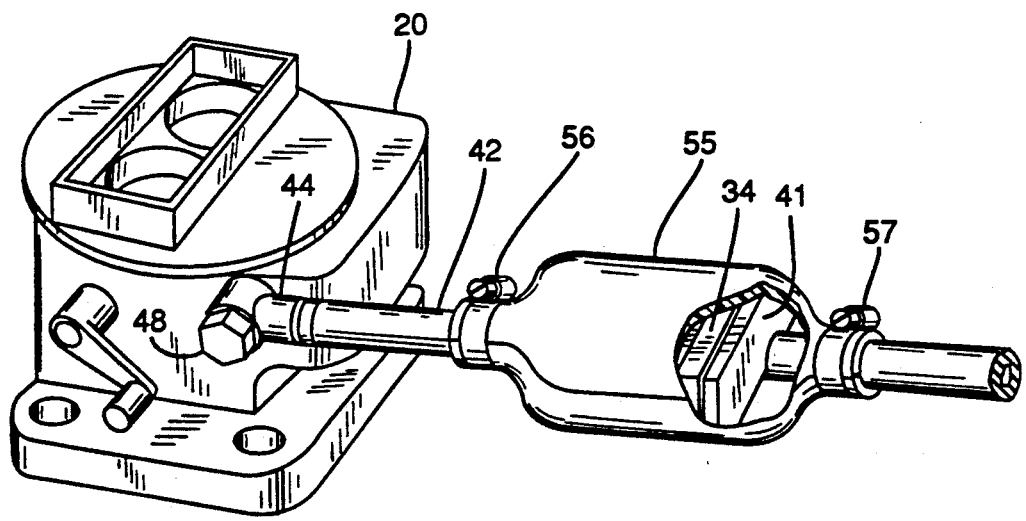
FIG. 3 is a perspective assembly drawing of the apparatus to improve fuel economy of the present invention.

Significant increase in fuel economy has been realized by the improvements shown in FIG. 2 through FIG. 4. The first improvement is a fabric reinforced rubber fuel line assembly 40 having a rubber hose 42 such as a Parker 296-10¼" ID rubber fuel line hose for delivering fuel from an inlet end to an outlet end. This fuel line assembly 40 has an outlet fitting 44 made of steel or aluminum. Similarly, an aluminum or steel inlet fitting 46 is fitted to the inlet side of the fuel line assembly 40. A banjo nut 48 made of steel or aluminum is used to attach the fuel line 40 the carburetor 20. The key is that the fittings 44, 46, and 40 have no copper in these fitting such as is true with brass or copper fittings. The fuel line hose 42 is attached to the fittings 44 and 46 with non-metallic clamps 52.

A magnet assembly 41, in this case, designated a 5HD magnet, is strapped by means of nylon straps 32 and 34 to the rubber fuel line 42. The 5HD magnet 41 is approximately 5¼" long, 1½" wide, and 2" high and produces approximately 560 gauss. It has been found by experimentation that the field strength of magnet 41 should be between 500 gauss and 1,000 gauss. The increased length of this magnet induces the magnetic field over a longer portion of the fuel line 42, thus, increasing the length of time that the magnetic field is induced in the traveling fuel. The larger diameter of hose 42 compared to the size of conventional metal fuel lines also slows the travel of the fuel increasing the time that the magnetic field is exposed to the fuel. A sheet rubber wrap 50 being approximately 11¼" square by ⅛" thick is wrapped about the magnet 41 and a portion of the fuel line 42 in contact with the magnet. This shield or rubber wrap 50 is held in place by two nylon straps 53 and 54.

It has been found that the rubber shield 50, when used with gasoline engines, can be reduced in thickness to approximately 1/16" while still maintaining its effectiveness. With these improvements, six diesel tractors were tested, similar to the method used in Table I, with an increase in fuel mileage of 45 percent. This increase in fuel mileage is attributable to the fuel line being rubber, having a large ID 60 as shown in FIG. 4, and non-metallic reinforcement such as fabric fiber 62.

TABLE II

| Tractor Number | Without Unit MPG | With 5HD Unit and Rubber Wrap MPG | % Increase in MPG |
|---|---|---|---|
| 71 | 3.52 | 4.92 | 40.07 |
| 82 | 5.00 | 7.28 | 45.60 |
| 142 | 3.79 | 5.49 | 44.85 |
| 180 | 4.06 | 6.22 | 53.20 |
| 184 | 4.22 | 6.37 | 50.95 |
| 187 | 4.50 | 6.10 | 37.11 |
| Average | 4.18 | 6.06 | 45.06% |

In an alternate embodiment of the invention shown in FIG. 3, the rubber wrap 55 may be a two-piece molded unit whose seam overlap and are held together with non-metallic clamps 56 and 57. This embodiment speeds installation time and reduces the package size of the unit, but at additional cost.

Having illustrated and described the principles of the invention in a preferred embodiment, it should be apparent to those skilled in the art that the invention can be modified in arrangement and detail without departing from such principles.

I claim all modifications coming within the spirit and scope of the following claims:

1. An apparatus to improve fuel economy of an internal combustion engine, comprising:
   a fuel delivery means for conveying fuel from an inlet to an outlet;
   a magnet means lying adjacent a longitudinal portion of said fuel delivery means for providing a magnetic field about said fuel delivery means; and
   a shielding means of a rubber material for surrounding said magnet means and said longitudinal portion of said fuel delivery means, the shielding means serving to shield the magnet means and a magnetic field induced in fuel flowing in said longitudinal portion of said fuel delivery means.

2. An apparatus to improve fuel economy of an internal combustion engine, comprising:
   a fuel delivery means for conveying fuel from an inlet to an outlet, wherein said fuel delivery means includes a non-metallic fuel line having a copper-free metallic inlet fitting and copper-free metallic outlet fitting;
   a magnet means for providing a magnetic field about said fuel delivery means; and a shielding means for surrounding said magnet means.

3. An apparatus to improve fuel economy as recited in claim 1 wherein said magnetic means is a permanent magnet having a field strength of between 500 gauss and 1,000 gauss and wherein said magnet has a north magnetic pole and a south magnetic pole and said south magnetic pole is oriented toward said fuel delivery means.

4. An apparatus to improve fuel economy of an internal combustion engine, comprising:
   a fuel delivery means for conveying fuel from an inlet to an outlet;
   a magnet means for providing a magnetic field about said fuel delivery means; and
   a shielding means for surrounding said magnet means, wherein said shielding means is a rubber sheet material wrapped about said magnet means and a portion of said fuel delivery means contacted by said magnet means.

5. An apparatus to improve fuel economy of an internal combustion engine, comprising:
   a fuel delivery means for conveying fuel from an inlet to an outlet;
   a magnet means for providing a magnetic field about said fuel delivery means;
   a shielding means for surrounding said magnet means, wherein said shielding means is a molded rubber member defining a cavity in which to place and to surround said magnet means and a portion of said fuel delivery means contacted by said magnet means.

6. A method for improving fuel economy of internal combustion engines comprising the steps of:
   providing a rubber fuel line having an inlet end and an outlet end;
   placing metallic fittings on the inlet end and outlet end of said rubber fuel lines wherein said metallic fittings do not contain copper;
   placing a permanent magnet in contact with said rubber fuel line to induce a magnetic field in the fuel in said fuel line; and
   wrapping said magnet and said fuel line in the area of said magnet with a rubber shield.

7. A method for improving fuel economy of internal combustion engines as recited in claim 6 wherein said step of placing a permanent magnet in contact with said fuel line includes affixing said magnet to said fuel line with non-metallic straps.

8. A method for improving fuel economy of internal combustion engines as recited in claim 6 wherein the step of wrapping said magnet with a rubber shield includes attaching said rubber shield to said magnet with non-metallic straps.

* * * * *